United States Patent [19]

Carpentier

[11] Patent Number: 4,909,272
[45] Date of Patent: Mar. 20, 1990

[54] GATE VALVE

[75] Inventor: Urgel R. Carpentier, Plattsburgh, N.Y.

[73] Assignee: Plattco Corporation, Plattsburgh, N.Y.

[21] Appl. No.: 389,146

[22] Filed: Aug. 3, 1989

[51] Int. Cl.⁴ .................. F16K 3/02; F16K 43/00; B08B 3/04; B08B 9/06

[52] U.S. Cl. .................. 137/240; 134/166 C; 137/315; 137/329.03; 137/244; 251/328; 251/329

[58] Field of Search .......... 137/238, 240, 242, 137/244, 318, 329.01, 329.02, 329.03; 134/166 C; 251/326, 327, 328, 329

[56] References Cited

U.S. PATENT DOCUMENTS

| | | | |
|---|---|---|---|
| 1,085,013 | 1/1914 | Bordo | 137/329.03 |
| 2,000,853 | 5/1935 | Lange | 137/244 |
| 2,669,416 | 2/1954 | Hilton | 251/329 |
| 2,851,051 | 9/1958 | Englert et al. | 251/329 |
| 2,873,943 | 2/1959 | Williams | 251/329 |
| 3,000,608 | 9/1961 | Williams | 251/328 |
| 3,207,471 | 9/1965 | Williams | 251/328 |
| 3,333,816 | 8/1967 | Williams et al. | 251/327 |
| 3,945,604 | 3/1976 | Clarkson | 251/328 |
| 4,383,546 | 5/1983 | Walters, Jr. | 137/240 |
| 4,773,627 | 9/1988 | King et al. | 251/328 |

FOREIGN PATENT DOCUMENTS 1102145  10/1955  France .................. 251/328

Primary Examiner—George L. Walton
Attorney, Agent, or Firm—Lowe, Price, LeBlanc, Becker & Shur

[57] ABSTRACT

An improved gate valve is described. The valve utilizes a flat gate having a beveled edge which slices across a central passage in the valve housing when the valve closes. A manifold is disposed in the passage to direct a purge stream of fluid across the beveled edge as the gate closes. The valve housing consists of upstream and downstream housings which are intended to be bolted together. The adjacent portions of the housings form a first slot in which the gate is slidably received and a second slot downstream of the second slot is formed in the downstream housing. In one embodiment a seat is slidably disposed in the slot which extends laterally across the passage parallel to the gate. In another embodiment the slot extends axially along the passage and the seat is cylindrical slidably retained therein. In the cylindrical seat embodiment the seat is reversible.

11 Claims, 5 Drawing Sheets

FIG. 1
FIG. 2
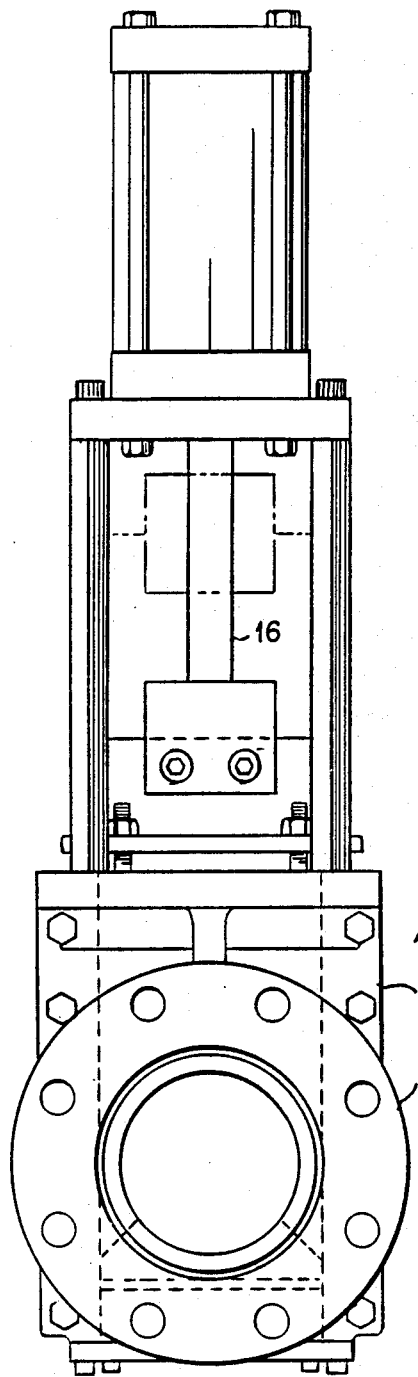
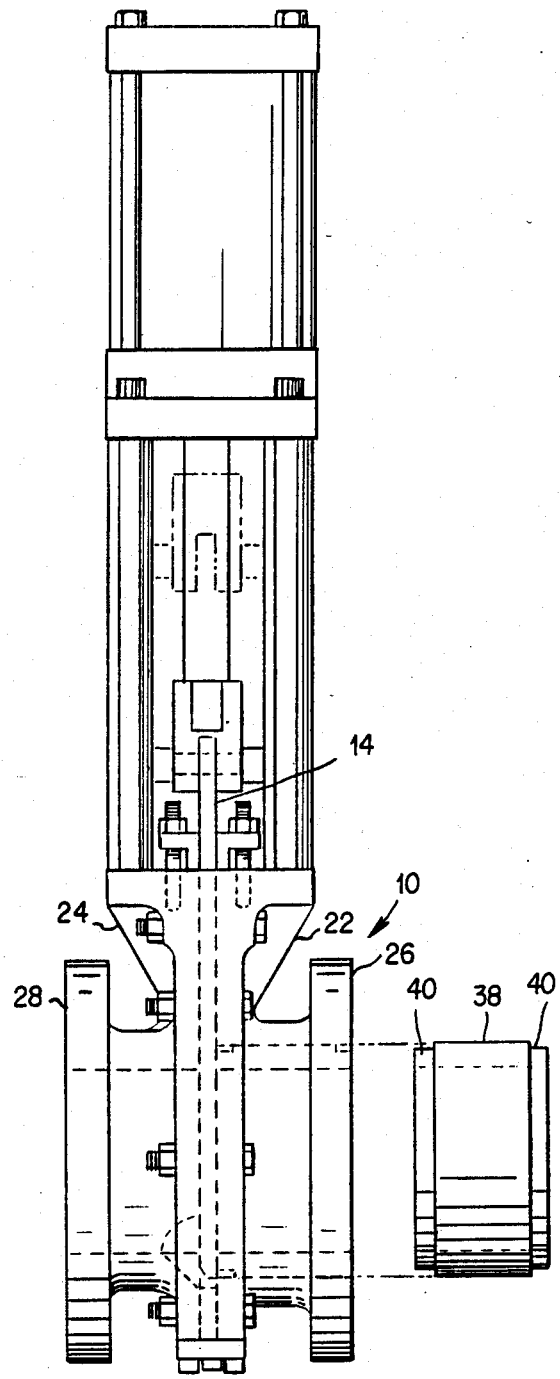

GATE VALVE

FIELD OF THE INVENTION

This invention relates to gate valves for use primarily with liquids, sludges or the like, but which also can be used for a gaseous or dry material. This invention relates in particular to a gate valve in which the seat can be easily removed or replaced and which includes a purge system upon closing to effect a better seal with reduced wear on the gate and seat.

BACKGROUND OF THE INVENTION

A variety of different gate valves have been in use for many years. Typically a gate valve has a flat steel or cast sliding plate or gate which closes against a seat to shut off a flow of material, liquid or gas. Most gate valves are used with liquids although some are used with dry materials.

Flap gate valves are normally used with dry materials and such valves are described in my prior U.S. Pat. Nos. 4,480,812, 4,498,492, 4,308,894, 3,410,422 and 3,257,045, assigned to the assignee of this invention. Flap gate or flap valves used in conveying dry materials have maintenance problems relative to excessive wear of the valve seat. When it is necessary to replace the seat it would be desirable, especially with large valves to remove and replace the seat without having to dismantle the entire valve. In addition, as described in certain of my above patents, a sliding action is desirable even in a flap gate or flap valve upon closing to wipe the valve seat, and in the case of a vacuum line, upon opening, to break the vacuum before the flap opens.

Similarly with gate valves, valves are often located on a factory floor where it is difficult to disassemble the valve to replace the seat. Accordingly, it would be desirable to provide a valve in which the seat could be easily removed or replaced and in which the seat could be removed without dismantling the entire valve. Furthermore, even in gate valves it would be desirable to provide a means for clearing the seat surface as the gate closes to minimize wear and to effect a better seal. If particles are lodged between the seat and the edge of the gate, obviously a seal may not be complete and said particles can cause excessive wear in localized areas. In such case then such wear could result in a valve which could not seal so that the seat and/or the gate would have to be completely replaced.

SUMMARY OF THE INVENTION

It has been discovered that an improved gate valve can be constructed according to this invention wherein the seat is reversible. In this embodiment when the seat wears, the face of the valve is removed, and the seat is merely reversed so the opposite edge becomes the seat and the entire unit need not be discarded.

In another object of this invention a gate valve is provided in which the seat can be removed either from the right side, the left side, or from the bottom as desired without dismantling the entire valve. In this embodiment the valve can be adapted to the particular factory floor so that it may be serviced and maintained with a minimum of effort.

In both embodiments of this invention the gate itself has a beveled edge which upon closing serves to slice through the materials or sludge and force materials away from the contact point between the seat and gate edge. Furthermore, immediately upstream of the contact point on the seat a purge system is provided which directs a stream of a gas or liquid upwardly to purge the edge of the gate as it closes. The beveled edge then acts in conjunction with the purge system to force materials away from the contact point with the seat and into the purge stream.

Accordingly it is an object of this invention to provide an improved gate valve which may be easily maintained and serviced.

It is another object of this invention to provide a gate valve which may be adapted to any factory floor so that it can be serviced and maintained with a minimum of effort.

It is another object of this invention to provide a gate valve in which the seat can be removed without dismantling the valve and taking it "off line."

It is still another object of this invention to provide a purge system for removal of materials from the edge of the gate as it closes against the valve seat by directing a stream of air, gas or liquid upwardly the edge of said gate as it closes.

It is yet a further object of this invention to provide an improved gate valve which combines either a reversible seat or a seat which can be easily removed and a gate having a beveled edge with a purge system on the seat for slicing through materials as the valve closes and pushing said materials into the purge stream so that the edge of the gate and the seat can close to form an effective seal without excessive wear.

BRIEF DESCRIPTION OF THE DRAWINGS

These and other objects will become readily apparent with reference to the drawings and following description wherein:

FIG. 1 is a front view of an unbonneted embodiment of a gate valve of this invention.

FIG. 2 is a side view of the valve of FIG. 1 showing a removable, reversible seat in an exploded form.

DETAILED DESCRIPTION OF THE INVENTION

Figure 3:
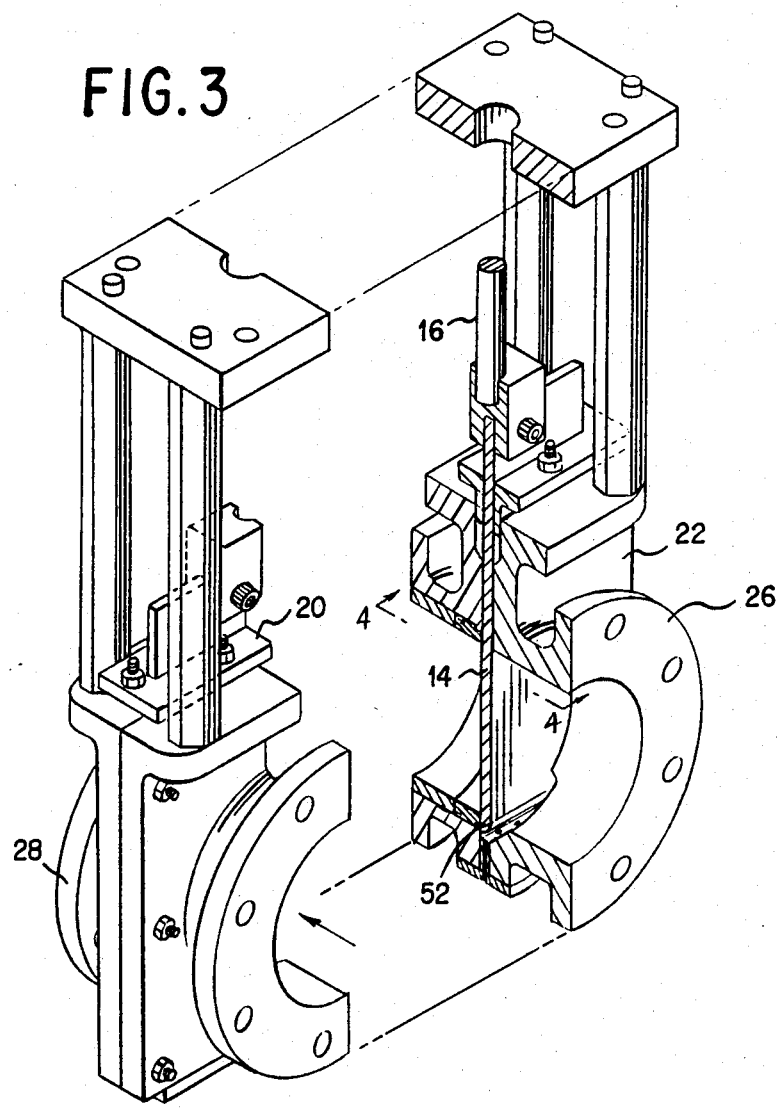
FIG. 3 is a sectional view of an embodiment of the valve of this invention wherein the seat is removable and reversible.
Figure 4:
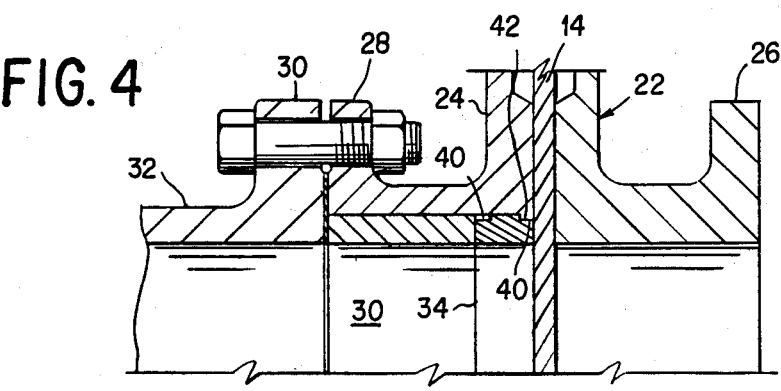
FIG. 4 is a fragmentary cross-sectional view taken along lines 4—4 of FIG. 3.
Figure 5:
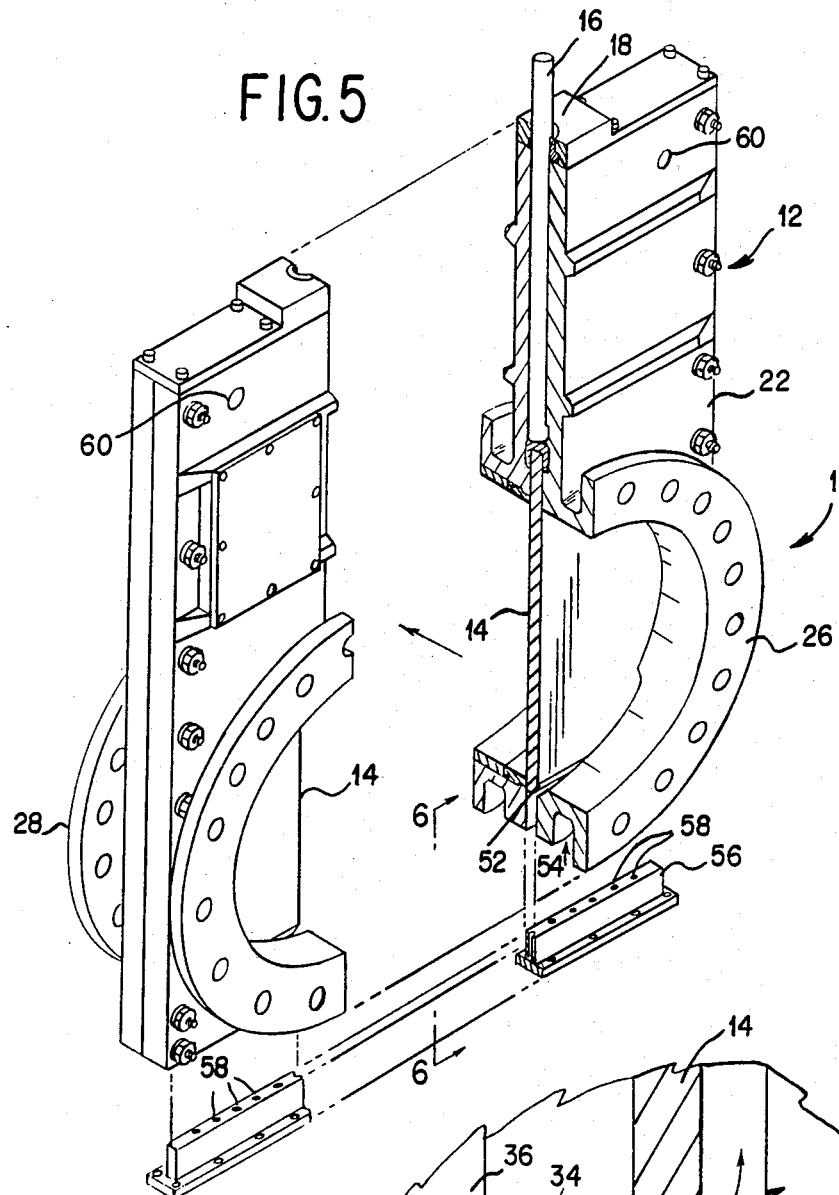
FIG. 5 is a view similar to FIG. 3 showing a bonneted gate valve with the purge system in exploded form.

With attention to the drawings and to the embodiments of FIGS. 1-6 in particular, the valve of this invention 10 may be unbonneted as shown in FIGS. 1-3 or bonneted as shown in FIG. 5. The effect of the bonnet 12 is to fully enclose the valve gate 14 so that only actuator rod 16 extends from the bonnet through packing 18. Actuator rod 16 then is driven by for example a conventional linear actuator (not shown) to open and close the valve 10. In the unbonneted form the valve gate 14 extends through a seal 20.

The valve of this invention includes an upstream housing 22 and a downstream housing 24 which are bolted together. Each housing mounts a flange 26 and 28 respectively. The flanges 26 and 28 are intended to be bolted to mating flanges of a conduit. In FIG. 4, a mating flange 30 for a conduit 32 is shown for illustrative purposes only. The valve gate 14 then is slidably mounted between the two halves 22 and 24 of the valve 10 of this invention.

With attention to FIGS. 3 and 4 gate 14 is intended to slide, when valve 10 is opened and closed, against a circular seat 34 as shown in this embodiment. Seat 34 is retained in the position shown by retaining ring 36. Ring 36 is then intended to abut flange 30 of the downstream conduit 32 when the valve is fully assembled. In the embodiment of FIG. 2, the seat and retaining ring are a unitary piece 38. Seat 34 or 38 has grooves 40 on either end thereof. The downstream half 24 of valve 10 has an internal depression adjacent internal flange 42 adjacent gate 14 in which the groove 40 mates.

In order to replace the seat 34 or 38, the downstream conduit 32 is unbolted and the downstream half 24 of valve 10 is separated from the upstream half 22. The seat 38 then is removed and reversed in the embodiment of FIG. 2, or in the embodiment of FIG. 4 retaining ring 36 and seat 34 are removed and seat 34 is reversed. The valve and conduit are then reassembled. In this way then the seat can be reversed with a minimum of effort, or replaced, if both sides have been worn, with a minimum of effort.

Figure 6:
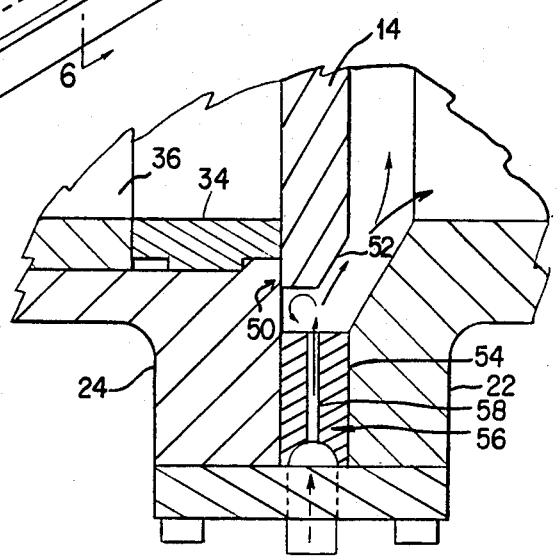
FIG. 6 is a fragmentary cross-sectional view taken along lines 6—6 of FIG. 5.

With attention to FIGS. 5 and 6, the lower edge 50 of gate 14 has a beveled edge 52 on its upstream surface. The beveled edge as described above, helps the gate 14 to slice through the material conveyed and tends to force material outwardly away from the surface 52.

The lower portion of the upstream housing 22 defines a slot 54 which extends laterally across said housing 22. A manifold 56 having a plurality of holes 58 therethrough is inserted in said slot 54. As shown in FIG. 6 a purge stream is directed onto the beveled surface 52 and the lower portion 50 of gate 14 through manifold 56. The purge may be either gaseous or liquid and would normally be either air or water. This purge then tends to wipe the beveled surface 52 and lower portion 50 of gate 14 as the gate closes so that solid particles are not caught between the manifold 56 and the lower surface 50 of the gate 14. If solid particles are caught, they will tend to cause wear and in addition will make a seal faulty.

As noted above, FIG. 5 shows a bonneted valve. While the bonnet 12 as shown consists of opposed plates purge holes 60 are provided in order to purge the interior of the bonnet 12. As above, either gaseous or liquid material can be used for the purge and normally the purge fluid would be air or water.

Figure 7:
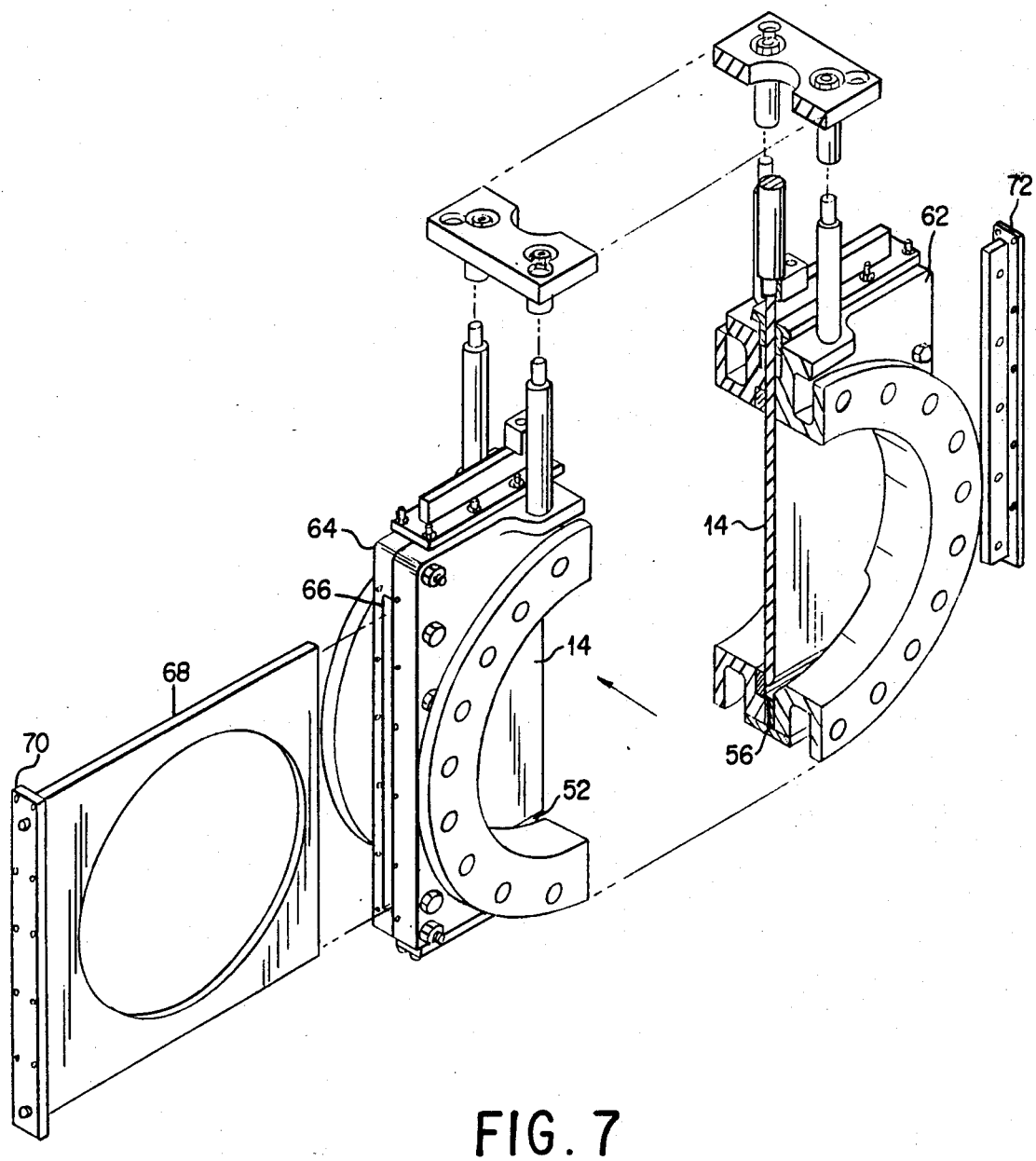
FIG. 7 is a cross-sectional view of an unbonneted embodiment of this invention showing the removable seat in exploded form.
Figure 8:
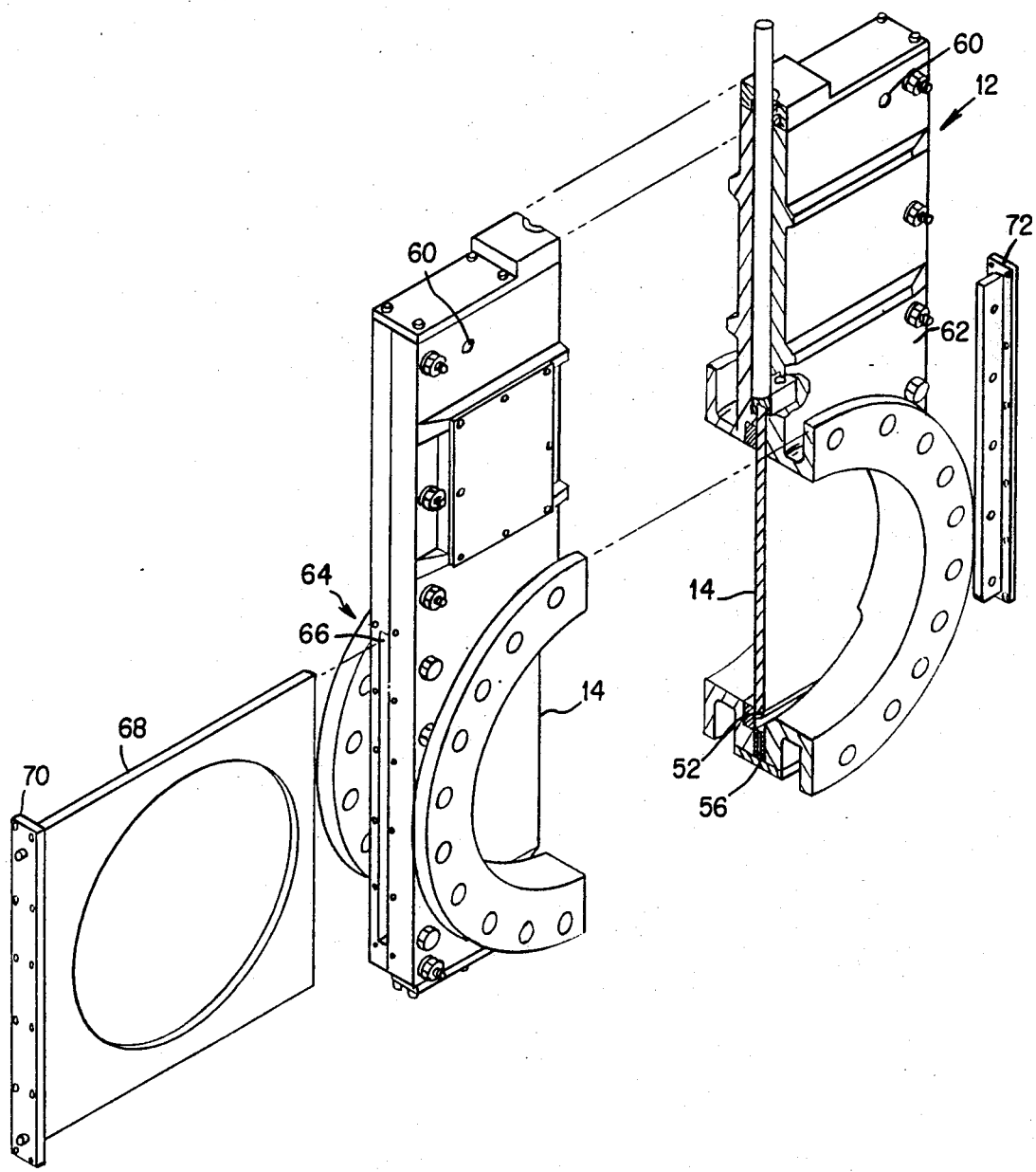
FIG. 8 is a view similar to FIG. 7 only showing a bonneted gate valve of this invention.

With attention to the embodiments of FIGS. 7 and 8, as discussed above, FIG. 7 shows an unbonneted gate valve of this invention and FIG. 8 shows the bonneted version. The advantage of this embodiment is that the seat can be removed as will be subsequently explained from either side or from the bottom without dismantling the valve housing.

With attention to the drawings, the valve consists of upstream housing 62 and downstream housing 64. These housings are bolted together in the normal fashion. Housing 64 defines a slot 66 as shown in FIGS. 7 and 8. The valve seat 68 is intended to be inserted into slot 66 and flange 70 bolted to housings 62 and 64. The opposite side of the slot 64 is closed with flange member 72.

It will be obvious to those skilled in the art that seat 68 could be inserted and removed from either side depending upon the layout of the factory floor. Accordingly if it proved to be more convenient to be able to insert and remove the seat 68 from the right side rather than the left as shown in the figures, parts 68 and 72 could be reversed. It will also be obvious to those skilled in the art that the slot could open downwardly through the bottom of the valve so that the valve seat would be removable from the bottom rather than from one of the sides. While this feature is not shown in the drawings it is intended to be part of this invention.

As discussed, the embodiment of FIG. 8 differs from the embodiment of FIG. 7 only by the presence of bonnet 12 which is intended to fully enclose the gate 14 and is provided with purge holes 60 similar to those discussed above with reference to FIG. 5. This embodiment is intended to include the manifold 56 shown in FIG. 6 and preferably the gate 14 has a beveled edge 52 as described above with reference to FIG. 6.

In summary then, this invention includes an improvement for a gate valve which provides a manifold along the lower surface thereof which admits a purge stream upstream of the gate as the gate closes. The gate of this invention further includes a beveled lower edge so that when the gate closes it slices through material being conveyed and the purge stream or either liquid or gaseous fluid clears the surface and seat as the gate closes to perfect a seal.

In one embodiment of this invention the seat is readily removable by dismantling the downstream half of the valve where the seat may be removed and reversed. In another embodiment of this invention the seat is removable without dismantling the valve from either side or from the bottom. The seat is retained in a slot between the two halves of the valve disposed in the downstream half. Removal of external bolts then is the only action necessary to remove the seat. The seat may then be reversed or replaced readily without regard to a lengthy dismantling procedure which may be difficult due to the presence of other machinery on the factory floor.

The invention may be embodied in other specific forms without departing from the spirit or essential characteristics thereto. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A gate valve comprising:
    an upstream housing and a downstream housing said housings defining an axial central passage therethrough, upper and lower portions, and a face disposed perpendicular thereto the faces of said housing being normally disposed abutting each other, the faces defining a first slot extending across the central passage and the downstream housing face defining a second slot downstream of the first slot;
    connecting means for releasably connecting said housings at the abutting faces;
    a flat gate slidably received in the first slot slidable between a closed position wherein the passage is blocked and a open position wherein the passage is open;

a seat removably mounted in the second slot having an opening therethrough concentric with the central passage, said seat being normally disposed to abut the downstream side of said gate when said gate is in the closed position, the passage is circular in cross-section and the set is cylindrical and slidably axially received in the second slot, said seat has upstream and downstream lateral faces, the seat faces being identically configured and matingly engaging in upstanding shoulder edge in the second slot so that said seat is reversible in the second slot; and purge means disposed with ⋄ in the first slot and across the central passage upstream of said gate for directing a flow of fluid across a portion of the upstream side of said gate as said gate closes.

2. The valve of claim 1 wherein said gate is a plate having an edge disposed perpendicularly to the axis of the passage and being movable through the passage as the gate moves between the open and closed positions.

3. The valve of claim 2 wherein the upstream portion of the gate edge is beveled.

4. The gate of claim 3 wherein said purge means directs a flow of fluid across the beveled edge as the gate moves into the closed position.

5. The valve of claim 4 wherein said purge means includes a manifold with fluid dispensing holes therein disposed in the passage upstream of the gate and adjacent the beveled edge when the gate is in the closed position.

6. The valve of claim 5 wherein the first gate receiving slot extends across the passage and through the upper portion of the housings so that in the open position a portion of said gate extends through the upper portion of said housing, a bonnet means surrounding the upper portion of the housings for enclosing the upper portion of said gate when said gate is in the open position.

7. The valve of claim 5 wherein the second seat receiving slot extends across the passage and outwardly through an outer portion of said downstream housing and said seat is radially slidably received in the second slot and retaining means for removably retaining said seat in said second slot.

8. The valve of claim 7 wherein said seat includes a flat plate having a centrally disposed port therethrough, the port being coaxially disposed in the central passage when said seat is retained in the second slot by said retaining means.

9. The valve of claim 8 wherein the second slot extends across the passage and outwardly through opening in opposite sides of said downstream housing.

10. The valve of claim 1 further comprising axial retaining means normally disposed in the passage abutting the downstream face of said seat for retaining said seat in said slot.

11. The valve of claim 1 wherein the seat faces each define a circumferential groove and said downstream housing defines a mating protrusion surrounding the passage adjacent the first slot whereby when said gate is in the closed position and the protrusion is received in the groove the upstream face of said seat will abut the downstream side of said gate.

* * * * *